INVENTOR.
STANLEY A. BJORKLUND
BY Schroeder, Hofgren,
Brady + Wegner
ATTY'S

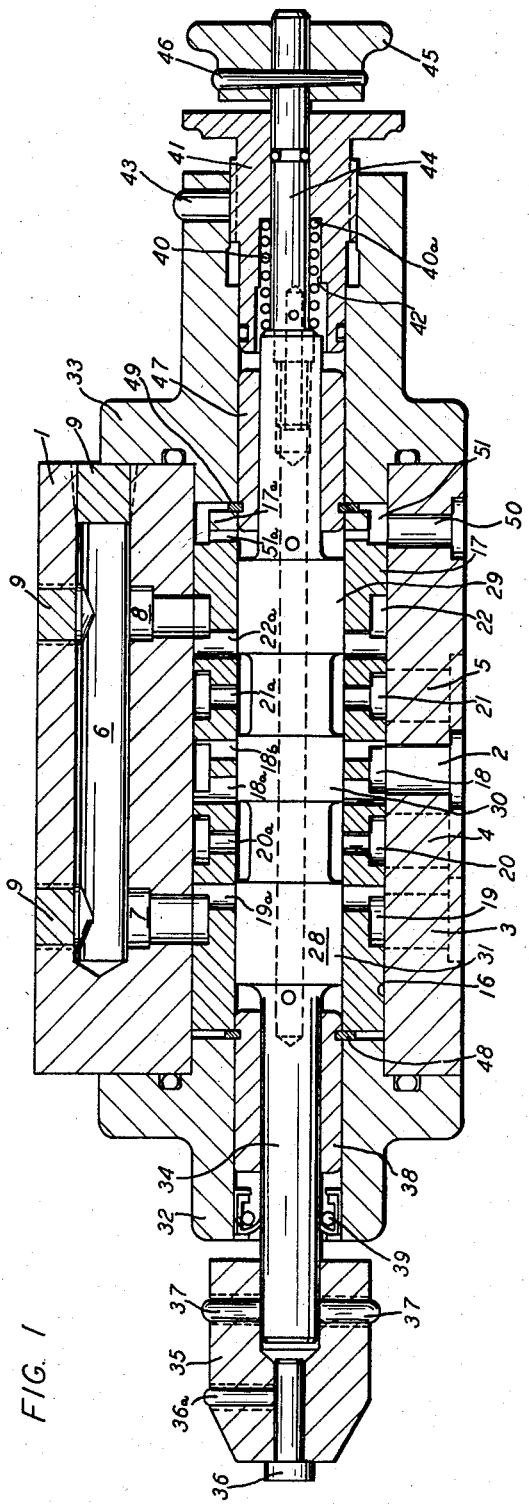
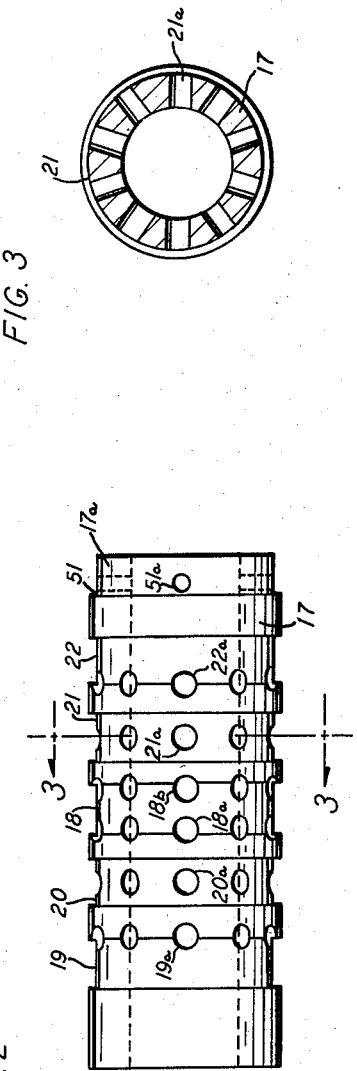
Feb. 9, 1960     S. A. BJORKLUND     2,924,239
SERVO VALVE HAVING HELICALLY ARRANGED METERING PARTS
Filed Aug. 13, 1954     2 Sheets-Sheet 1
INVENTOR.
STANLEY A. BJORKLUND Feb. 9, 1960   S. A. BJORKLUND   2,924,239
SERVO VALVE HAVING HELICALLY ARRANGED METERING PARTS
Filed Aug. 13, 1954   2 Sheets-Sheet 2

United States Patent Office 2,924,239
Patented Feb. 9, 1960

2,924,239

SERVO VALVE HAVING HELICALLY ARRANGED METERING PORTS

Stanley A. Bjorklund, Loves Park, Ill., assignor to Rockford Machine Tool Co., a corporation of Illinois Application August 13, 1954, Serial No. 449,547

4 Claims. (Cl. 137—622)

This invention relates to a valve, and more particularly to a valve embodying new and improved features of construction.

The general object of the invention is to provide a new and improved valve that may be used as a fourway servo valve to control a pump or fluid motor, or as a three-way servo valve.

Another object is to provide a valve in which a series of cylindrical ports of equal diameter are radially arranged around a circumference of a valve sleeve in a slight helical arrangement so that a non-helical land on a movable spool type valve member will open or close such ports progressively from one end of the helical arrangement to the other end.

Yet another object is to provide in a valve having a casing with fluid passages and a valve sleeve with grooves communicating with said passages, a non-helical land on a spool type valve that controls progressively the degree of opening of a plurality of ports of identical diameter arranged in a slight helix in the valve sleeve, the ports communicating with the grooves.

A further object of the invention is to provide a valve comprising, a casing, a sleeve mounted in the casing having a plurality of series of ports of the same diameter arranged in slight helices around its circumference, means connecting each series of ports to an associated externally opening passage in the casing, and a slidable valve member mounted in the sleeve having non-helical lands operable upon movement to progressively open the ports so as to provide smooth, non-chattering operation of a device to be controlled.

Other objects and advantages of the invention will become apparent from the following detailed description taken in connection with the accompanying drawings, in which:

Fig. 1 is a sectional view in elevation of a valve embodying the features of the invention;

Fig. 2 is a side view in elevation of the valve sleeve showing the ports opening into the external annular grooves on the sleeve;

Fig. 3 is a vertical section of the valve sleeve taken along the line 3—3 of Fig. 2;

Figure 4:
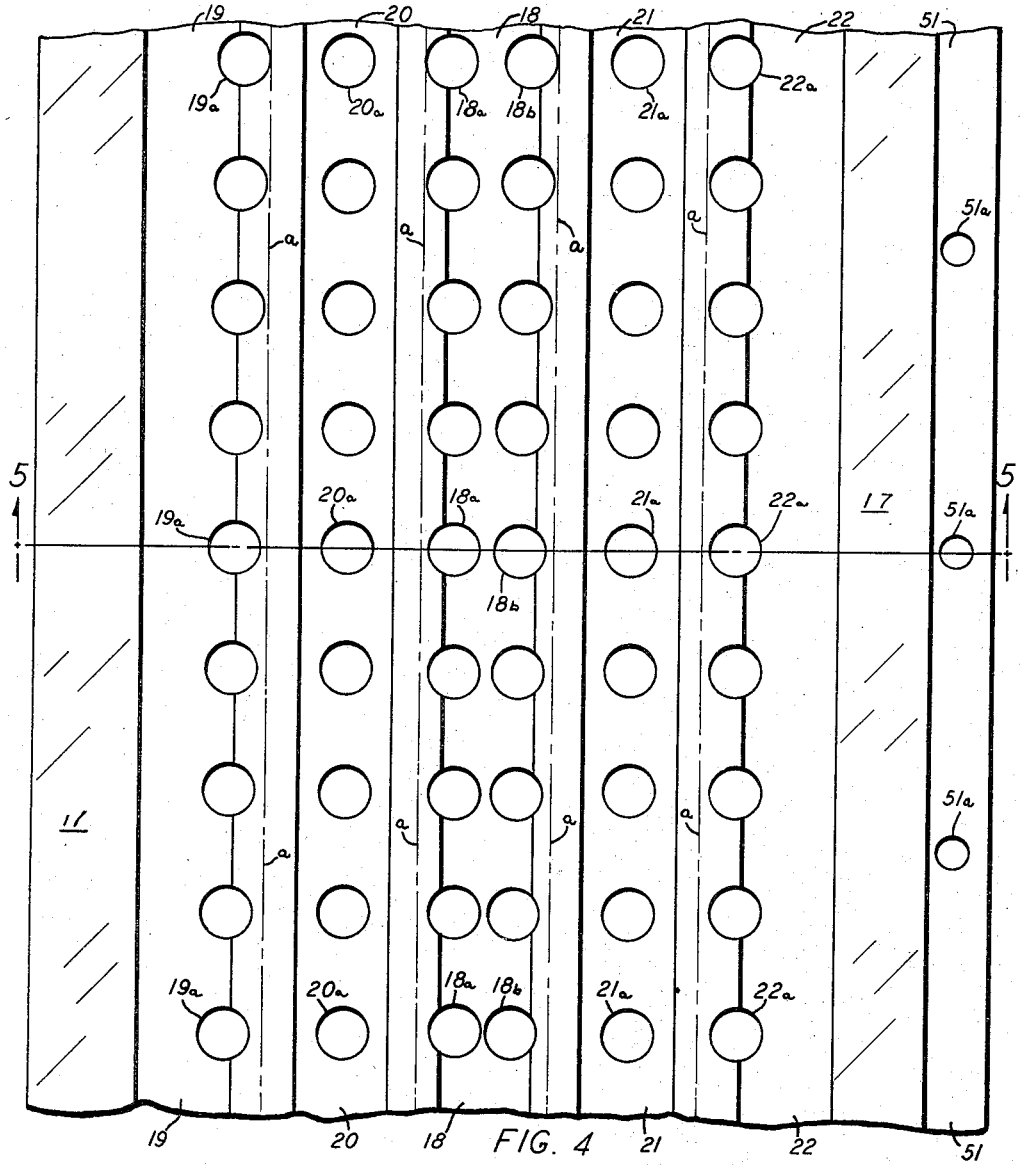
Fig. 4 is a development of the major portion of the valve sleeve of Fig. 2 showing the helical arrangement of certain series of ports, the arrangement being slightly exaggerated to more clearly illustrate this feature.

In the form of the invention shown in the drawings, a four-way valve has a casing 1 provided with a plurality of externally opening passages 2, 3, 4 and 5 adapted for the flow of control fluid. The passage 2 is adapted to be connected to a source of fluid under pressure, and the passages 4 and 5 are adapted to be connected to opposite sides of a control device, such as a cylinder pump or fluid motor.

The casing 1 has a plurality of connecting bores 6, 7 and 8 which communicate with the exhaust passage 3 which is adapted to be connected to a tank. The outer ends of bores 6, 7 and 8 are closed by plugs 9.

Positioned in a cylindrical bore 16 of casing 1 is a sleeve 17 having a plurality of circumferential grooves 18, 19, 20 and 21 which align with externally opening passages, 2, 3, 4, and 5, respectively, when the sleeve is positioned in the casing 1. An additional circumferential groove 22 in the sleeve is aligned with the bore 8 in the casing.

A plurality of series or rows of radial cylindrical ports of equal diameter, which may be either drilled or reamed, are disposed in calculated positions about the circumference of the sleeve 17. These ports include the rows of control ports 20a and 21a which lie in non-helical paths about the circumference of the sleeve with their axes in a plane perpendicular to the axis of the sleeve 17. Centrally positioned between the rows of control ports 20a and 21a are two series or rows of pressure ports 18a and 18b. These ports are positioned around the circumference of sleeve 17 in slightly opposing helical arrangements. Positioned on the other sides, respectively, of control ports 20a and 21a are two series or rows of exhaust or drain ports 19a and 22a extending around the circumference of sleeve 17 in opposing slight helical arrangements. As shown best in Figs. 2, 4 and 5, all ports in each series communicate with the groove corresponding to each series of ports, that is, ports 19a, 20a, 18a and 18b, 21a, and 22a communicate with grooves 19, 20, 18, 21 and 22, respectively.

Slidably mounted in sleeve 17 is a spool type valve member 28 having three non-helical lands 29, 30 and 31 adapted to control the flow of fluid through the ports.

As shown in Fig. 1, the casing 1 has end caps 32 and 33 secured thereto. An outer extension 34 of valve member 28 extends outwardly through the end cap 32 and has secured thereto by means of threaded pins 37 an assembly 35, including a stylus follower 36 secured therein by pin 36a. The extension 34 slides in a bearing 38 mounted in the end cap 32 and a fluid seal 39 is provided.

The valve member 28 is urged in one direction by a spring 40 disposed between an end of the valve member and a rotatably adjustable threaded member 41 threadably mounted in the end cap 33. One end 40a of the spring 40 fits in a recess 42 in the member 41 and the compression of the spring may be varied by rotation of the member 41.

The member 41 is held in adjusted position by a threaded pin 43. A rod member 44 having a handle 45 secured thereto by pin 46 is connected to an end of valve member 28 in order to permit manual movement of the valve member 28 against the action of the spring 40.

A bearing 47 is mounted in the end cap 33 and supports the right hand end of the valve member. The bearings 38 and 47 are secured against movement by snap rings 48 and 49.

The casing 1 has a drain passage 50 which communicates with radial openings 51a in sleeve 17 through a groove 51, formed by a reduced portion 17a of sleeve 17, casing 1 and end cap 33, to drain off leakage fluid.

In a neutral position of the valve member 28, as shown in Fig. 1, exhaust ports 19a and 22a are substantially covered by the valve lands 29 and 31, while pressure ports 18a and 18b are substantially covered by valve land 30. It is preferred that, with the valve member 28 in neutral position, the valve be statically balanced and for this purpose a slight overlap, of about .001", of the ports is provided so that there will be a small flow (or "blow-by") of oil when the valve is in such neutral position. This flow is quite slight and the ports may be considered to be substantially closed as far as resulting movement of the device to be controlled is concerned. As the valve member 28 is shifted from its neutral position by the action of stylus 36 against a master pattern in one direction (for example, to the right as seen in Fig. 1), a series of exhaust and pressure ports 22a and 18a are progressively opened. This allows fluid to flow from pressure port 18a through control port 20a to one side of a control device. Simultaneously, fluid flows from the other side of a control device through control port 21a and out the corresponding exhaust port 22a. Shifting of the valve member 28 in the other direction by spring 40 progressively opens the series of exhaust and pressure ports 19a and 18b, so that fluid flows from pressure port 18b through control port 21a to the control device, and simultaneously from the control device through control port 20a and out exhaust port 19a. Because of the helical arrangement of each group of pressure and exhaust ports and their equal diameters, this flow of fluid is a gradual flow resulting in more even servo control, rather than the sudden surges of fluid when all of the corresponding ports are opened or closed simultaneously.

Figure 5:
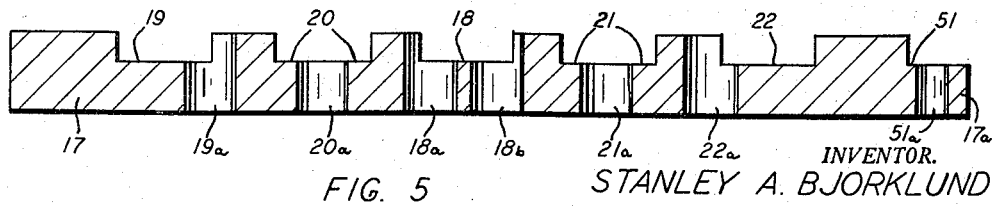
Fig. 5 is a vertical section of the valve sleeve taken along the line 5—5 in Fig. 4.

This gradual flow is the result of the helical arrangements of each group of pressure ports 18a and 18b and exhaust ports 19a and 22a, which is best shown in the development of the major portion of sleeve 17 in Fig. 4, wherein the helical arrangement is slightly exaggerated. In Fig. 4, the two center spaced series of ports, pressure ports 18a and 18b are in a helical arrangement, and the two outside series of ports 19a and 22a, the exhaust or drain ports, are also in a helical arrangement. Disposed intermediate each series of exhaust and pressure ports, 19a and 18a, and 22a and 18b, are control ports 20a and 21a in non-helical arrangements on sleeve 7. The control ports are never closed by the lands 29, 30 and 31 on valve member 28. The helix defined by each of the exhaust ports 19a and 22a and each of the pressure ports 18a and 18b is very slight so as to provide a gradual increase in port area as a result of the movement of valve member 28.

In order to illustrate the helical disposition of the series of ports 19a, 18a, 18b and 22a, the imaginary broken lines "a" have been added to the showing of Fig. 4. The lines "a" are disposed parallel to the length of the grooves and disposed adjacent to the helically arranged series of ports so as to more clearly show the helical disposition of the ports.

In an actual embodiment of the invention, the ports are 3/16" in diameter while the displacement of the axis of each successive port in a helical series along sleeve 17 is .002". There being ten ports in each series, the maximum displacement of the axes of the two ports at the ends of each helix is .018".

I claim:

1. A servo valve, comprising, a valve casing having a longitudinal bore therein, a cylindrical valve sleeve positioned in the bore, first and second longitudinally spaced, circumferential series of radial ports in the valve sleeve, the ports in each series comprising bores of a size to permit an unrestricted flow of fluid when opened, means forming first and second longitudinally spaced circumferential grooves respectively connecting outer ends of the first series of ports and outer ends of the second series of ports, longitudinally spaced passages in the valve casing leading respectively from the first and second grooves for connection respectively with a device to be controlled and a source of fluid, the ports in at least one of said series being arranged in a slight helix around the valve sleeve with succeeding ports in the helical series respectively displaced longitudinally of the valve sleeve relative to preceding ports by an amount less than the diameter of the ports, and a spool type valve member slidable in the valve sleeve for controlling flow between the first and second series of ports including a non-helical valve land adapted in one position to substantially close the helical series of ports and movable with the valve member to progressively open the ports of the helical series, thereby preventing sudden surges of fluid through the valve.

2. A servo valve as defined in claim 1, wherein the ports in said one series of ports are arranged in a slight helix around the valve sleeve with succeeding ports in the helical series respectively displaced longitudinally of the valve sleeve relative to preceding ports by an amount less than the radius of the ports and with the total displacement of the last port in the series relative to the first port less than the diameter of the ports.

3. A servo valve for controlling operation of a work device, comprising, a valve casing having a longitudinal bore and longitudinally spaced fluid passages leading from the bore including a pressure passage for connection with a source of fluid under pressure, a control passage for connection with a work device and a drain passage for connection with a drain, a cylindrical valve sleeve positioned in the bore and having outer, longitudinally spaced, circumferential grooves in register respectively with the pressure passage, the control passage and the drain passage, a plurality of longitudinally spaced, circumferential series of radial ports in the valve sleeve opening respectively into said grooves, the ports in each series comprising bores of equal diameters of a size to permit relatively unrestricted flow of fluid through the valve when opened, the ports of the pressure series and the drain series being arranged in helices around the valve sleeve with succeeding ports in each helical series respectively displaced longitudinally of the valve sleeve relative to preceding ports by an amount less than the diameter of the ports, and a spool type valve member slidable in the valve sleeve for controlling flow from the pressure ports to the control ports and flow from the control ports to the drain ports including spaced valve lands adapted in one position to close the pressure ports and drain ports and movable with the valve member to open the drain ports or the pressure ports progressively, thereby preventing sudden surges of fluid through the valve.

4. A servo valve, comprising, a valve casing having a longitudinal bore and longitudinally spaced fluid passages leading from the bore including a pressure passage adapted for connection with a source of fluid under pressure, a pair of control passages positioned respectively on opposite sides of the pressure passage, each for connection with a work device, and a pair of drain passages one positioned outwardly from each control passage, each for connection with a drain, a cylindrical valve sleeve positioned in the bore and having outer, longitudinally spaced, circumferential grooves in register respectively with the five mentioned passages, a plurality of longitudinally spaced, circumferential series of radial ports in the valve sleeve, two series opening into the pressure groove, two series opening respectively into the control grooves, and two series opening respectively into the drain grooves, the ports in each series comprising bores of equal diameters of a size to permit free flow of fluid through the valve when open, the ports of the two pressure series being arranged in opposing helices around the valve sleeve with succeeding ports in each helical series respectively displaced longitudinally of the valve sleeve relative to preceding ports by an amount less than the diameter of the ports, the ports of the two drain series being arranged in opposing helices around the valve sleeve with succeeding ports in each helical series respectively displaced longitudinally of the valve sleeve relative to preceding ports by an amount less than the diameter of the ports, and a spool type valve member slidable in the valve sleeve for controlling flow from the two pressure series of ports respectively to the two control series of ports and for controlling flow from the two control series of ports respectively to the two drain series of ports including spaced, non-helical valve lands normally closing the pressure ports and the drain ports and movable with the valve member in one direction to connect one series of pressure ports with one series of control ports and to connect the other series of control ports to one series of drain ports, and movable in the opposite direction to connect the other series of pressure ports with said other series of control ports and to connect said one series of control ports with the other series of drain ports, said valve lands moving in shearing relation across the pressure ports and drain ports to open the ports progressively, thereby preventing sudden surges of fluid through the valve.

References Cited in the file of this patent

UNITED STATES PATENTS

| | | |
|---|---|---|
| 651,334 | Baker et al. | June 12, 1900 |
| 681,076 | Porter | Aug. 20, 1901 |
| 789,026 | Huston | May 2, 1905 |
| 1,123,273 | Gregersen | Jan. 5, 1915 |
| 2,316,944 | Ernst | Apr. 20, 1943 |
| 2,612,872 | Strayer | Oct. 7, 1952 |
| 2,620,823 | Adams | Dec. 9, 1952 |
| 2,631,571 | Parker | Mar. 19, 1953 |
| 2,648,313 | Clifton | Aug. 11, 1953 |
| 2,690,192 | Dannhardt | Sept. 28, 1954 |